E. H. ANGLE.
ORTHODONTIA APPLIANCE.
APPLICATION FILED AUG. 22, 1913.
1,142,790.  
Patented June 15, 1915.
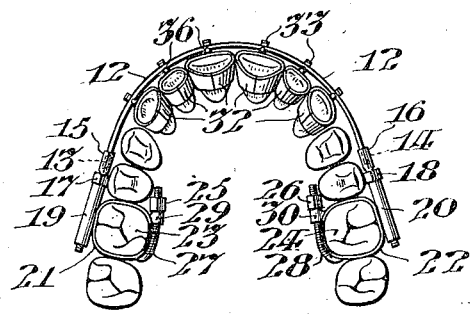
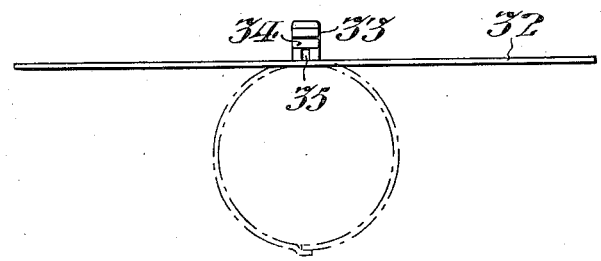
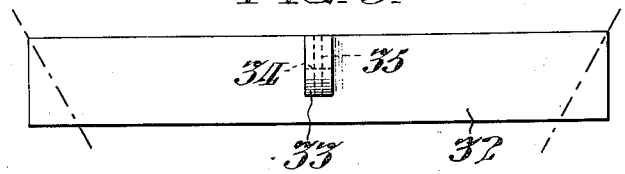
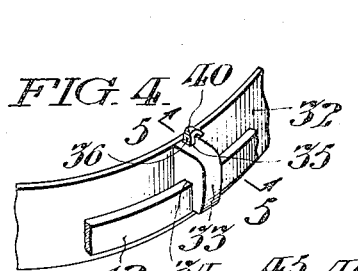
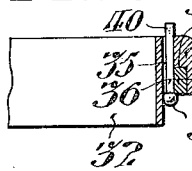
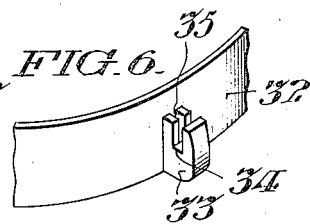
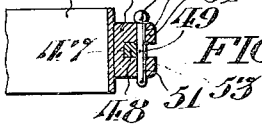
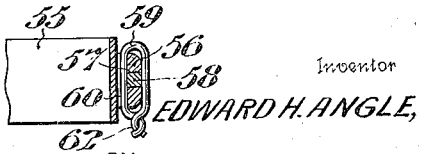
Inventor  
EDWARD H. ANGLE,
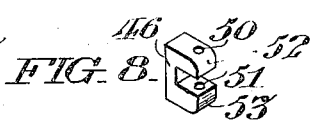
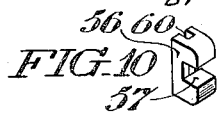
Witnesses
By Clifton C. Hallowell  
Attorney

UNITED STATES PATENT OFFICE.

EDWARD H. ANGLE, OF NEW LONDON, CONNECTICUT.

ORTHODONTIA APPLIANCE.

1,142,790.      Specification of Letters Patent.    Patented June 15, 1915.

Application filed August 22, 1913. Serial No. 786,056.

*To all whom it may concern:*

Be it known that I, EDWARD H. ANGLE, a citizen of the United States, and a resident of New London, in the county of New London, State of Connecticut, have invented certain new and useful Improvements in Orthodontia Appliances, of which the following is a specification, reference being had to the accompanying drawings.

My invention relates to devices employed in the art of orthodontia, particularly to that class of devices which include an arch-bow, and is especially directed to the means for detachably connecting selected teeth of the dental arch to the arch-bow.

The principal objects of my invention are, to provide simple and efficient means for affording ready attachment and detachment of the arch-bow with selected teeth of the dental arch; and to provide means to prevent the accidental displacement of said arch-bow from the tooth-attaching means when engaged therewith.

Other objects of my invention are, to provide such a connection of the arch-bow with the selected teeth of the dental arch as will readily produce rotative and axial movement of the teeth, as well as effect lateral adjustment; and to provide an arch-bow of such flexibility as will tend to automatically aline the teeth into the correct dental arch.

My invention comprehends a tooth-band having a slotted projection, and a flexible arch-bow of such cross-section as will be received within the slot in said projection without relatively rotating therein.

My invention also comprises a headed locking-bolt fitted in a slot in said projection, and prevented from relative rotation therein, for retaining said arch-bow engaged in its slot.

My invention also includes all of the various novel features of construction and arrangement hereinafter more definitely specified.

In the accompanying drawings, Figure 1 is an inverted plan view of the upper human dental arch, showing a convenient embodiment of my invention attached to selected teeth; Fig. 2 is a greatly enlarged plan view of one of the tooth attachments. Fig. 3 is a front elevational view of the tooth attachment shown in Fig. 2; Fig. 4 is a fragmentary perspective view of a tooth attaching band engaged with the arch-bow; Fig. 5 is a transversely sectional view taken on the line 5—5 in Fig. 4; Fig. 6 is a fragmentary perspective view of the tooth-band inverted; Fig. 7 is a fragmentary sectional view of a tooth-band embodying a modified form of attaching member; Fig. 8 is a perspective view of the attaching member shown in Fig. 7, *per se;* Fig. 9 is a fragmentary sectional view of a tooth-band embodying another modified form of attaching member; and Fig. 10 is a perspective view of the attaching member, shown in Fig. 9, *per se.*

The tooth regulating appliance to which this invention is especially applicable is indicated in a general way in Fig. 1, and includes, together with associated parts, an arch-bow consisting of a resilient middle section 12 fitted in suitable sockets 13 and 14 in the externally threaded end sections 15 and 16, which respectively pass through nuts 17 and 18, loosely inserted in the anchor tubes 19 and 20 of the respective anchor bands 21 and 22, as shown in detail in a prior Patent #1014030, granted to me Jan. 9, 1912.

As shown in Fig. 1 the anchor bands 21 and 22 are respectively secured to the first molars 23 and 24 upon opposite sides of the dental arch, by the adjusting nuts 25 and 26 on the threaded stems 27 and 28 respectively projecting from one end of the respective anchor bands 21 and 22, and extending through the eyes 29 and 30 respectively carried by the other free ends of the respective anchor bands.

My improvement resides in the means for detachably securing any malposed teeth in the dental arch to the arch-bow, and as best shown in Figs. 2 and 3 such means is formed of a strip 32 of sheet material, preferably metal, which may be bent to form the band as shown in dot and dash lines in Fig. 2, to embrace selected teeth as shown in Fig. 1, the ends of said strip 32 may if desired, be secured together in any suitable manner.

To the strip 32 is secured the lug or projection 33 having an open slot 34 in one wall thereof for the reception of the middle section 12 of the arch-bow, which is preferably of rectangular cross-section as best shown in Figs. 4 and 5, and of a breadth greater than its thickness.

The piece forming lug or projection 33 is also slotted in a direction transverse to the slot 34, in its wall which is joined to the strip 32 so that when said piece is secured to said strip, as shown in Fig. 2, an aperture 35 is formed which is preferably rectangular or of some shape that will prevent the rotation of the locking-bolt 36, which may be inserted therein from the side having the slot 34.

As best shown in Fig. 5 the locking-bolt 36 is provided with a head 38, overhanging the middle section 12 of the arch-bow, to prevent its accidental displacement from the slot 34 in the projection 33, and as best shown in Fig. 4, the opposite end 40 of the said locking-bolt 36 may be bent over to retain it in position and thereby effect the locking of said arch-bow in its slot.

It will be observed from inspection of Figs. 4 and 5 that the locking-bolt 36 as well as the arch-bow 12 is of a rectangular cross-section, to prevent their rotation in their respective slots, and while such configuration is deemed to be preferable, it is to be understood that other shapes may be as readily employed, so long as the arch-bow is fitted to its slot in such a manner as to effect the desired twisting action on the malposed tooth toward its normal alinement.

In the form of my invention shown in Figs. 7 and 8, the tooth-band 45 is provided with an exterior bifurcated lug 46 secured thereto, and having a slot 47 in its outer wall for the reception of the arch-bow 48, which is arranged to be held in said slot against accidental displacement, by the locking-bolt 49 which is extended through alined apertures 50 and 51 in the respective bifurcations 52 and 53 of the lug 46, exterior said arch-bow 48. The locking-bolt 49 may be conveniently provided with the head 54 forming a stop therefor.

In the form of my invention shown in Figs. 9 and 10, the tooth-band 55 is provided with an exterior lug 56 secured thereto, and having a slot 57 in its outer wall for the reception of the arch-bow 58, which is arranged to be snugly fitted therein by lateral adjustment, and prevented from accidental displacement, by the retaining guard 59 which is preferably formed of wire passed through the aperture 60 and bent over the outer wall of the lug 56 and arch-bow 58, and having its opposite ends twisted as shown at 62. As shown in Fig. 10 the piece forming the lug 56 may be slotted along the wall which joins the band 55 to form the aperture 60 when said lug is secured to the band, as shown in Fig. 9.

It will be readily seen that when the strip 32 is to be applied to a molar tooth, wherein the band will be substantially cylindrical, the ends of said strip should be trimmed substantially at right angles to the edge of said strip, but when it is to be applied to a tapering tooth such as an incisor or cuspid tooth, the ends should be trimmed at an angle as shown by the dot and dash lines in Fig. 3.

From the foregoing description of my improved tooth attaching means it will be obvious that the attachment of malposed teeth to, and their detachment from the arch-bow, without disturbing the relations between said arch-bow and its anchorage is greatly facilitated, it being only necessary to remove the locking-bolt to effect the disengagement of the arch-bow from the tooth-band, by a lateral movement of said bow.

I do not desire to limit my invention to the precise details of construction and arrangement herein set forth, as it is obvious that various modifications may be made therein without departing from the essential features of my invention as defined in the appended claims.

Having thus described my invention, I claim:

1. An orthodontia appliance, comprising a tooth-band having a projection provided with an open sided slot having an abutment surface in opposition to the plane of said band, and an arch-bow detachably fitted in the slot in said projection and having means comprising the longitudinal walls of the bar forming the bow coöperative with the walls of the slot, to prevent its rotation in said slot and arranged to engage said abutment surface to force said band radially outward.

2. An orthodontia appliance, comprising a tooth-band having a slotted projection, an arch-bow detachably fitted in the slot in said projection and having means to prevent its rotation in said slot, and a locking-bolt extending transversely with respect to said arch-bow and within the arch, for preventing the accidental displacement of the latter.

3. An orthodontia appliance, comprising means for engaging selected teeth of the dental arch, and having a slot forming an open sided recess therein and an aperture extending transversely with respect to said slot, a flattened arch-bow laterally inserted and snugly fitted in said slot and having means comprising its longitudinal surfaces to prevent its relative rotation, and a locking-bolt fitted in said aperture, arranged to prevent the accidental displacement of said arch-bow and having means to prevent its relative rotation to said bow.

4. An orthodontia appliance, comprising a tooth-band formed of a strip of sheet material arranged to be wrapped around selected teeth of the dental arch and having a projection provided with an open ended slot extending across one wall thereof, for the reception of an arch-bow laterally, and having an aperture extending transversely with respect to said slot, and a retaining bolt extending through said aperture and having a portion overhanging said slot to prevent the lateral displacement of said arch-bow.

5. An orthodontia appliance, comprising a tooth-band having a slotted projection, a laterally adjustable arch-bow formed of a polygonal flexible bar snugly fitted in the slot in said projection, and means independent of said arch-bow to prevent the accidental displacement of said bar from said slot.

6. An orthodontia appliance, comprising a tooth-band provided with a projecting lug having a free member extending toward one edge thereof, between which and the tooth-band is a recess in which an arch-bow may be retained.

In testimony whereof, I have hereunto set my hand this 13 day of August, A. D., 1913.

EDWARD H. ANGLE.

Witnesses:
F. E. Fengar,
Ira S. Avery.